(12) United States Patent
Gude et al.

(10) Patent No.: US 7,186,434 B2
(45) Date of Patent: Mar. 6, 2007

(54) POURABLE FATTY DISPERSIONS

(75) Inventors: Michael Gude, Vlaardingen (NL); Johannes Arie Laan, Vlaardingen (NL); Eckhard Flöter, Vlaardingen (NL)

(73) Assignee: Unilever Bestfoods, North America, Division of Conopco, Inc., Englewood Cliffs, NJ (US)

( * ) Notice: Subject to any disclaimer, the term of this patent is extended or adjusted under 35 U.S.C. 154(b) by 256 days.

(21) Appl. No.: 10/323,304

(22) Filed: Dec. 19, 2002

(65) Prior Publication Data
US 2003/0134029 A1 Jul. 17, 2003

(30) Foreign Application Priority Data
Dec. 19, 2001 (EP) .................................. 01205004

(51) Int. Cl.
*A23D 7/005* (2006.01)
(52) U.S. Cl. ....................................... 426/602; 426/606
(58) Field of Classification Search ................ 426/601, 426/606, 607, 307
See application file for complete search history.

(56) References Cited

U.S. PATENT DOCUMENTS

| | | | |
|---|---|---|---|
| 3,338,720 A | | 8/1967 | Pichel |
| 3,595,674 A | | 7/1971 | Shaffer et al. |
| 4,341,812 A | | 7/1982 | Ward |
| 4,446,165 A | | 5/1984 | Roberts |
| 4,726,959 A | * | 2/1988 | Momura et al. ............ 426/607 |
| 4,806,370 A | * | 2/1989 | Toyota et al. ................ 426/99 |
| 4,842,881 A | * | 6/1989 | Kanemaru et al. ......... 426/307 |
| 4,855,152 A | * | 8/1989 | Nakano et al. ............. 426/261 |
| 5,011,680 A | * | 4/1991 | Suzuki et al. ................ 424/64 |
| 5,013,574 A | * | 5/1991 | Hassel ........................ 426/612 |
| 5,071,669 A | * | 12/1991 | Seiden ........................ 426/660 |
| 5,106,644 A | * | 4/1992 | El-Nokaly .................. 426/603 |
| 5,142,071 A | * | 8/1992 | Kluesener et al. ......... 554/172 |
| 5,142,072 A | * | 8/1992 | Stipp et al. ................. 554/172 |
| 5,547,698 A | * | 8/1996 | Lansbergen et al. ....... 426/602 |
| 5,662,953 A | * | 9/1997 | Wheeler et al. ................ 426/2 |
| 5,681,608 A | * | 10/1997 | Cain et al. .................. 426/606 |
| 5,756,142 A | * | 5/1998 | Reckweg et al. ........... 426/603 |
| 5,858,444 A | * | 1/1999 | Aoe et al. ................... 426/601 |
| 5,976,598 A | * | 11/1999 | Akkaway et al. ........... 426/496 |
| 6,203,829 B1 | * | 3/2001 | Morikawa et al. ............ 426/89 |
| 6,277,430 B1 | * | 8/2001 | Cain et al. .................. 426/601 |
| 6,461,654 B1 | * | 10/2002 | Cain et al. .................... 426/94 |
| 6,582,748 B1 | * | 6/2003 | Loh et al. ................... 426/601 |
| 6,617,141 B1 | * | 9/2003 | Kaimal et al. .............. 435/134 |
| 2003/0215556 A1 | * | 11/2003 | Naber et al. ................ 426/601 |

FOREIGN PATENT DOCUMENTS

| | | | |
|---|---|---|---|
| EP | 0455278 | * | 3/1990 |
| GB | 1 092 236 | | 11/1967 |
| JP | 51 133453 | | 11/1976 |
| SU | 553 964 | | 7/1977 |
| WO | 98/47386 | | 10/1998 |
| WO | 00/38546 | | 7/2000 |
| WO | 01/05241 | | 1/2001 |
| WO | 01/43558 | | 6/2001 |
| WO | 01/56396 A | | 8/2001 |
| WO | 03/051134 A | | 6/2003 |

OTHER PUBLICATIONS

International Search Report on PCT Application No. PCT/EP 02/13141 mailed Jun. 5, 2003.
International Search Report on PCT Application No. PCT/EP 02/13141 mailed Jul. 10, 2003.
Sevil Ozgul et al.; "*In Situ Esterification of Rice Bran Oil with Methanol and Ethanol*", Journal of the American Oil Chemists' Society, vol. 70, No. 2, 1993, pp. 145-147.
European Search Report on EP Application No. EP 01 20 5004 dated Apr. 19, 2002.
Henon, G. et al.; "*Wax analysis of vegetable oils using liquid chromatography on a double-absorbent layer of silica gel and silver nitrate-impregnated silica gel*"; Journal of the American Oil Chemists Society, vol. 78, No. 4, 2001, pp. 401-410.
Garcia et al.; "*Supercritical Carbon Dioxide Extraction of Fatty and Waxy Material from Rice Bean*", Journal of the American Oil Chemists Society, vol. 73, No. 9, 1996, pp. 1127-1131.

* cited by examiner

*Primary Examiner*—Carolyn Paden
(74) *Attorney, Agent, or Firm*—Gerard J. McGowan, Jr.

(57) ABSTRACT

Liquid margarines and other pourable dispersions which contain a hardstock fat derived from plant waxes. The fat consists of a mixture of triglycerides, which fat is non-hydrogenated and contains less than 10 wt. % of fatty acid residues with a chain length of 6–10 carbon atoms, of which less than 50 wt. % of the triglycerides consist of monoacyl triglycerides and which fat is characterized in that its content of fatty acid residues which are saturated and contain at least 20 carbon atoms is at least 30 wt. %, preferably at least 40 wt. % and more preferably at least 50 wt. % calculated on total fatty acid residues. Such fat can be obtained by a process comprising the steps:
  selecting a plant wax,
  reacting the wax esters from the wax or a reactive derivative of those wax esters with glycerol or with a reactive glycerol derivative,
  purifying and recovering the obtained triglycerides,
  optionally admixing the product with a triglyceride fat such that the mixture complies with the above fat definition.

6 Claims, No Drawings

POURABLE FATTY DISPERSIONS

The present invention relates to a novel triglyceride fat and to pourable fatty dispersions consisting of a triglyceride oil in which a non-fat phase is dispersed and which dispersion further contains a stabilising amount of the novel fat. Liquid margarine is an example of such dispersion.

STATE OF THE ART

Margarine consists of a continuous fat phase and an aqueous phase which is dispersed as fine droplets in the fat phase. At ambient temperature liquid margarine has a pourable consistency which is realized by a proper selection of the fat phase ingredients.

Generally, margarine fat consists of a mixture of a fat which at ambient temperature is fully liquid (an oil) and the so-called hardstock fat which contains solid fat and which is included for its stabilising functionality. The ratio of liquid and solid fat is chosen such that after proper processing together with an aqueous phase the crystals of the solid fat form a lattice throughout the liquid oil resulting into a structured fat phase. The aqueous phase droplets are fixed within the spaces of the lattice of solid fat crystals. In this way coalescence of the droplets and separation of the heavier aqueous phase from the fat phase is prevented and a stable W/O-emulsion results. A liquid margarine needs a special hardstock fat which not only structures the liquid oil, but in the same time ensures pourability of the product. Liquid margarines containing a poor hardstock fat show phase separation. Phase separation, particularly oil exudation, becomes visible as a layer of oil on the surface of the liquid margarine.

A stable liquid margarine should be substantially free from oil exudation. It is, however, difficult to combine good stability with good pourability. The stabilizing solid fat crystals may adversely affect pourability. Liquid margarine manufacture therefore requires a hardstock fat having delicately balanced properties.

The problem of preparing a satisfactory liquid margarine has been addressed since long as appears from the content of e.g. U.S. Pat. No. 3,595,674, SU 553964, JP 51133453, U.S. Pat. Nos. 5,756,142, 3,338,720, 4,446,165, 4,341,812 and GB 1092236.

Those prior art references, generally suggest several fats for use as hardstock fat, but seldom a specification of their performance is found. The vaguely defined mixtures lack a specification of type of fats, of blend ratios and of actual performance.

For some hardstock fats which are commonly used in the manufacture of plastic margarines we have established their performance, particularly the resulting emulsion stability and pourability, when those hardstock fats are applied in a liquid margarine. Emulsion stability is measured by an oil exudation test and pourability by the Bostwick test (see protocols in the examples section). Table I shows the results.

TABLE I

LIQUID MARGARINE (80% FAT) PREPARED WITH SUNFLOWER OIL AND COMMON MARGARINE HARD STOCK FATS
Stability and Pourability

| | Hardstock fat (HS) (1) | HS (2) (wt. %) | Oil exudation (3) [v/v %] | * | Bostwick value (4) [cm/15 sec] | # | @ |
|---|---|---|---|---|---|---|---|
| 1 | SF69 | 2 | 4.5 | − | 23 | + | −+ |
| 2 | BO65 | 2 | 4.5 | − | 23 | + | −+ |
| 3 | RP68 | 2 | 4.5 | − | 23 | + | −+ |
| 4 | PO58 | 2 | 11 | − | 2 | − | −− |
| 6 | AR60 | 2 | 3 | − | 20 | + | −+ |
| 7 | CS62 | 2 | 10 | − | 24 | + | −+ |
| 8 | RPhe70 | 2 | 0.7 | + | 22 | + | ++ |

(1) Abbreviations explained in Table II
(2) Percentage of hardstock fat on fat phase
(3) *: Oil exudation is a measure for stability (after 2 weeks at 15° C.) +: oil exudation 2 or less, adequate −: oil exudation >2, not adequate
(4) #: Bostwick value is a measure for pourability +: Bostwick value ≧12, adequate −: Bostwick value <12, not adequate @ ++: good quality liquid margarine hardstock −+, +−, −−, not acceptable quality For stability the standard is an oil exudation rate which is 2 or less measured after 2 weeks storage at 15° C. With an oil exudation value >2 the liquid margarine has an unacceptable, inhomogeneous product appearance and a bad performance when used for cooking. Excessive oil exudation is expected for extended storage at 15° C.

TABLE II

FULLY HYDROGENATED FATS

| Name fat before hydrogenation | Abbreviation hydrogenated fat | Melting point (° C.) |
|---|---|---|
| Sunflower seed oil | SF69 | 69 |
| Soybean oil | BO65 | 65 |
| Low erucic rapeseed oil | RP68 | 68 |
| Palm oil | PO58 | 58 |
| High erucic rapeseed oil | RPhe70 | 70 |
| Arachidic oil | AR60 | 60 |
| Cottonseed oil | CS62 | 62 |

Good pouring behaviour is a matter of human perception and is determined by product viscosity and package design. For pourability the standard is a Bostwick value which is at least 12. A liquid margarine having a lower value is too thick and lacks sufficient pourability. Products with values between 12 and 15 are still denoted as pourable, in contrast to products which have Bostwick values <12 which have a squeezable consistency.

In the context of the present specification a liquid margarine qualifies as an acceptable product when it complies with the above pourability and stability standards.

Present Hardstock Fats

Up to now fully hydrogenated high erucic rapeseed oil (shortly denoted as fully hardened rapeseed oil or RPhe70) is the only commercial hardstock fat which complies with the above standards and therefore is widely used for the manufacture of good quality liquid margarines. See e.g. U.S. Pat. No. 5,756,142.

RPhe70 is unrivalled as hardstock fat not only in liquid margarine, but also in other pourable fatty dispersions consisting of a triglyceride oil in which a non-fat phase is dispersed. WO 98/47386, for example, deals with the stabilisation of a pourable dispersion which contains herbs dispersed in an oil structured with a hardstock fat. In prior art references other fats have been suggested as possible hardstock fat: hardened sunflower seed oil, hardened soybean oil, hardened palm oil, hardened cottonseed oil or mixtures thereof, but only hardened sunflower seed oil has been exemplified. The fat is vaguely qualified as having "acceptable properties".

Generally, liquid margarines are prepared with 1.5–5 wt. % of hardstock fat on total fat phase.

Although RPhe70 is considered a high quality liquid margarine hardstock fat, its use also has less favourable aspects. RPhe70 is derived from natural rapeseed oil which has a high erucic acid content. From a nutritional point of view erucic acid containing raw materials should be avoided in the preparation of food compositions. Besides this aspect and its high price, RPhe70 has the further major drawback that it is obtained by hydrogenation, a chemical treatment which does not fit in the present trend to avoid in food manufacture chemically processed and particularly hydrogenated ingredients.

Although a fat obtained by a process comprising a hydrogenation step and the same fat obtained without chemical processing may be identical from a chemical point of view, these substances are considered actually different from a nutritional point of view. This means that a substance, which could be obtained only by use of hydrogenation, and is prepared for the first time without hydrogenation should be considered novel with respect to the former substance.

Prior art references strongly suggest that suitable hardstock fats for liquid margarines are to be sought only among hydrogenated fats. We have found, however, a new class of hardstock fats which are able to effectively structure liquid oil, particularly on behalf of the manufacture of liquid margarine and other pourable oil dispersions.

SUMMARY OF THE INVENTION

We have identified a new class of hardstock fats which are suited for liquid margarine manufacture. Specific fats may surpass RPhe70 in stability and pourability performance. The fat composition is as defined in the claims. It is characterized in that it is non-hydrogenated and that its content of fatty acid residues which are saturated and contain at least 20 carbon atoms is at least 30 wt. %, preferably at least 40 wt. % and more preferably at least 50 wt. % on total fatty acid residues.

We have found a process for the preparation of such non-hydrogenated hardstock fat. The process preferably employs plant waxes as source material.

A further embodiment of the invention is a food product, preferably an oily particles dispersion and a pourable W/O-emulsion, of which the fat phase is structured by the invented hardstock fat.

DETAILS OF THE INVENTION

The new fat contains a high content of long C20+ fatty acid residues, but less than 10 wt. % of short fatty acid residues having a chain of 6–10 carbon atoms. The found fat may contain monoacylglycerides having identical acyl residues such as glyceride tribehenate, but less than 50 wt. % calculated on total triglycerides.

The fat according to the invention may be prepared by esterifying glycerol or a partial glyceride in such ratio with a reactive fatty acid derivative or with a mixture of such derivatives that the desired glyceride is obtained.

We have found a method for manufacturing the fat of the present invention which is relatively cheap and which uses plant waxes as source material.

Waxes are esters of long chain fatty alcohols and long chain fatty acids. Often these fatty acids contain 20 or more (denoted as C20+) carbon atoms. Waxes are a waste material resulting from vegetable oil refining and so form a cheap source material for the manufacture of the hardstock fats of the present invention.

The fat according to the invention preferably contains at least 50 wt. % of fatty acid residues which are derived from plant wax.

The novel non-hydrogenated fats must contain saturated C20+fatty acids in an amount of at least 30 wt. %, preferably at least 40 wt. % and more preferably at least 50 wt. % on total fatty acids.

Fully hydrogenated high erucic rapeseed oil happens to contain 51 wt. % of C20+ fatty acids, but—being a hydrogenated fat—it is excluded from the invention.

Manufacturing processes used for converting waxes to the desired triglycerides are based on state of the art chemistry. Generally, such process comprises the steps:

selecting a plant wax, having the wax esters from the wax or a reactive derivative of those wax esters react with glycerol or with a reactive glycerol derivative, purifying and recovering the obtained triglycerides.

A suitable process comprises, for example, alcoholysis of a wax which contains the C20+ fatty acid residues using a lower alcohol (e.g. n.propanol), which yields lower alcohol esters of the wax fatty acids. These esters either are converted to the corresponding acyl chlorides and as such are reacted with glycerol under formation of the desired triglycerides. Alternatively, the esters when mixed with glycerol may be subjected to catalytic transesterification. Instead of glycerol also an active glycerol derivative like partial (mono- or di-)glyceride or a triglyceride fat can be used for such transesterification.

The obtained fat product is purified and, optionally, is admixed with a triglyceride fat having such fatty acid composition that the final mixture consists of a mixture of triglycerides, which fat is non-hydrogenated and contains less than 10 wt. % of fatty acid residues with a chain length of 6–10 carbon atoms and less than 50 wt. % of monoacyl triglycerides and which content of fatty acid residues which are saturated and contain at least 20 carbon atoms is at least 30 wt. % which fatty acid content is calculated on total content of fatty acid residues. Preferably, the optional fat is admixed in an amount less than 50 wt. % of the final product.

The additional mixing serves as a way either to bring the reaction product to a fat which consists of a mixture of triglycerides, which fat is non-hydrogenated and contains less than 10 wt. % of fatty acid residues with a chain length of 6–10 carbon atoms and less than 50 wt. % of monoacyl triglycerides and which content of fatty acid residues which are saturated and contain at least 20 carbon atoms is at least 30 wt. % which fatty acid content is calculated on total content of fatty acid residues or to economize by diluting the reaction product with a cheaper fat.

The wax of rice bran or sunflower seeds is a preferred source material.

Some of the found fats have appeared to be superior to RPhe70. Emulsions made with those fats show a much improved emulsion stability at ambient temperatures of 25° C. and even higher. After 4 weeks of storage at 25° C. a liquid margarine prepared with such hardstock fat does not exhibit visible oil exudation and after 8 weeks the exudation is less when compared with the same emulsion but prepared with RPhe70.

Without wishing to be bound by theory it is believed that the splendid functionality is based on a typical crystallisation of the novel fats throughout the fat phase as a stable lattice of fine crystals which do not recrystallize during storage of the final product. The semi-fluid lattice of fine crystals sufficiently entraps the dispersed aqueous droplets without adversely affecting the pourability of the emulsion.

The present invention provides a high quality liquid margarine hardstock fat, which fat can be obtained without relying on hydrogenation.

A further embodiment of the invention comprises a food product which contains the fat of the invention. A preferred product is a pourable W/O-emulsion consisting of an aqueous phase emulsified with a fat phase containing at 1–10 wt. %, preferably 1.5–5 wt. % of the found hardstock fat. The emulsion preferably is a liquid margarine, preferably one containing 70–90 wt. % of fat phase.

Another embodiment is a food product comprising a liquid fat phase which product additionally contains particles dispersed in the fat phase and having a size of 0.01–10 mm. The dispersion contains 1–10 wt. %, preferably 1.5–5 wt. % of the found fat.

The particles consist of matter, preferably chosen from the group consisting of cooking salt, fruit, vegetables, herbs, seeds, gas bubbles, flour, proteins, vitamins and polyphenols. The food products according to the invention have a pourable consistency.

With some trials the skilled man easily can find out what amount of hardstock fat is suitable for making a stable dispersion for a specific type of particulate matter.

The invention is illustrated with the example described below:

Measuring Oil Exudation

A stoppered 100 ml glass measuring cylinder is filled with a sample up to the top mark. After two weeks storage at 15° C. the thickness of the separated oil layer is measured and expressed as vol. % on total sample volume. The vol. % is the rating for emulsion stability.

Measuring Pourability

Pourability is measured according to the standard Bostwick protocol. The Bostwick equipment consists of a 125 ml reservoir provided with an outlet near the bottom of a horizontally placed rectangular tub and closed with a vertical barrier. The tub's bottom is provided with a 25 cm measuring scale, extending from the outlet of the reservoir. When equipment and sample both have a temperature of 15° C., the reservoir is filled with 125 ml of the sample after it has been shaken by hand ten times up and down. When the closure of the reservoir is removed the sample flows from the reservoir and spreads over the tub bottom. The path length of the flow in cm measured after 15 seconds is the Bostwick rating, the yard stick for pourability. Table III shows Pourability categories for liquid margarine.

TABLE III

POURABILITY CATEGORIES FOR LIQUID MARGARINE

| very thick | Bostwick < 1, |
|---|---|
| Thick | Bostwick 1–5, |
| Squeezeable | Bostwick 5–12, |
| Pourable | Bostwick ≧ 12. |

The used scale corresponds with real product performance.

Preparation of Hardstock Fat

Wax from sunflower seeds was purified in the usual way by precipitation from an acetone solution. The purified wax (20 wt. %) was dissolved in n.propanol and the solution heated to boiling. A (10 wt. %) solution of sodiumpropylate in n.propanol (5 volume parts) was added to 95 volume parts of the wax solution. In the subsequent reaction the wax was converted to wax fatty alcohols and to propylesters of the fatty acids of the wax.

The reaction mixture was filtered hot to remove insoluble material, then partially evaporated to remove most of the n.propanol and the residue was dissolved in hot toluene. The fatty alcohols crystallized from the toluene solution on subsequent cooling and were separated. The dissolved fatty acid esters were recovered after purification on a chromatography column.

The purified esters were hydrolysed into free fatty acids in the usual way. First the fatty acids were converted to the corresponding acid chlorides with thionyl chloride and then the acid chlorides reacted with glycerol in the presence of pyridin yielding the desired triglyceride. Alternatively the purified esters were mixed with glycerol in a molecular ratio of 3:1 and heated in the presence of a catalytic amount of sodium. Propanol was formed as a byproduct and was removed by vacuum evaporation. The triglyceride hardstock fat as obtained by either process was purified by crystallization from acetone Preparation of Liquid Margarine A liquid margarine containing 80 wt. % fat was produced using a hardstock fat derived from sunflower seed wax and employing standard labscale Votator™ equipment.

Fat phase ingredients selection:

| sunflower oil | 77.8 wt. % |
|---|---|
| hardstock fat | 1.95 wt. % |
| soybean lecithin | 0.25 wt. % |

The fat phase was prepared by mixing said ingredients. 80 wt. parts of the fat phase were mixed with 20 wt. parts of water and the mixture was stored at 60° C. in a premix tank.

With a throughput of 4 kg/h the premix was pumped from the premix tank through a series of three scraped surface heat exchangers which lowered the temperature of the emulsion to approximately 5° C. For completing the fat crystallisation process the emulsion was conducted through a holding unit (0.15 l) and a pin stirrer (operating at 1500 rpm).

At the exit of the pin stirrer samples of the product, having a temperature of approximately 16° C., were discharged into several 0.4 l containers which were stored at 5° C., 15° C. and 25° C. respectively.

Samples denoted (A) were prepared with a hardstock fat according to the invention. For comparison samples denoted (B) were prepared with fully hydrogenated high erucic rapeseed oil.

Samples were stored for 8 weeks at said temperatures and another week at 15° C. before assessment.

For all samples the relevant emulsion properties: droplet size, pourability and oil exudation were established. Table IV shows the results.

Droplet size ($D_{3,3}$) was measured according to the standard (benchtop pulsed NMR) protocol.

Pourability was established as described above by applying the standard Bostwick test.

Stability was measured by establishing oil exudation as described hereinbefore.

TABLE IV

| Emulsion properties 9 weeks after preparation | Sample A | Comparison Sample B |
|---|---|---|
| $D_{3,3}$ (micrometer) | 4.8 | 5.4 |
| 15° C. Bostwick (cm) | 14 | 15 |
| Oil exudation (%) after storage | | |
| at 5° C. | 2.1 | 3.6 |
| at 15° C. | 2.8 | 5.2 |
| at 25° C. | 4.9 | 10.2 |

From these figures it appears that surprisingly beneficial product properties result from using the invented non-hydrogenated hardstock fat. Particularly emulsion stability at elevated temperatures has improved without significantly affecting other relevant product properties.

The invention claimed is:

1. A food product including a hardstock fat comprising a mixture of triglycerides, which fat is non-hydrogenated and contains less than 10 wt. % of fatty acid residues with a chain length of 6–10 carbon atoms and less than 50 wt. % of monoacyl triglycerides and which content of fatty acid residues which are saturated and contain at least 20 carbon atoms is at least 30 wt. % which fatty acid content is calculated on total content of fatty acid residues, said food product being a pourable W/O-emulsion comprising an aqueous phase emulsified with 90–70 Wt. % of a fat phase, which fat phase contains 1–10 wt. % of said hardstock fat wherein the fat phase comprises a hardstock fat of which at least 50 wt. % of its fatty acid residues are derived from plant wax.

2. A food product according to claim 1 wherein the fat phase comprises a hardstock fat which content of fatty acid residues which are saturated and contain at least 20 carbon atoms is at least 40 wt. %.

3. A food product according to claim 1 wherein the fat phase comprises a hardstock fat which content of fatty acid residues which are saturated and contain at least 20 carbon atoms is at least 50 wt. %.

4. A food product according to claim 1 which is a liquid margarine.

5. The food product according to claim 1 further comprising particles dispersed in the fat phase and having a size of 0.01–10 mm.

6. The food product according to claim 5, where the particles comprise material chosen from the group consisting of cooking salt, fruit, vegetables, herbs, seeds, gas bubbles, flour, proteins, vitamins and polyphenols.

* * * * *